(12) United States Patent
Holm

(10) Patent No.: US 10,789,954 B2
(45) Date of Patent: Sep. 29, 2020

(54) TRANSCRIPTION PRESENTATION

(71) Applicant: Sorenson IP Holdings, LLC, Salt Lake City, UT (US)

(72) Inventor: Michael Holm, Bountiful, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 113 days.

(21) Appl. No.: 16/116,638

(22) Filed: Aug. 29, 2018

(65) Prior Publication Data
US 2020/0075013 A1    Mar. 5, 2020

(51) Int. Cl.
G10L 15/26         (2006.01)
G06F 16/338       (2019.01)
G06F 16/683       (2019.01)
G06F 16/335       (2019.01)

(52) U.S. Cl.
CPC .......... *G10L 15/26* (2013.01); *G06F 16/335* (2019.01); *G06F 16/338* (2019.01); *G06F 16/685* (2019.01)

(58) Field of Classification Search
USPC ..................................................... 704/1–504
See application file for complete search history.

(56) References Cited

U.S. PATENT DOCUMENTS

| | | | | |
|---|---|---|---|---|
| 6,535,848 B1 * | 3/2003 | Ortega | .................. | G06F 16/685 704/235 |
| 6,816,468 B1 | 11/2004 | Cruickshank | | |
| 9,361,887 B1 * | 6/2016 | Braga | ..................... | H04W 4/21 |
| 9,525,830 B1 | 12/2016 | Roylance et al. | | |
| 9,772,816 B1 * | 9/2017 | Bigham | ................... | G10L 15/26 |
| 10,192,554 B1 * | 1/2019 | Boehme | .................. | G10L 15/26 |
| 10,388,272 B1 * | 8/2019 | Thomson | ................ | G10L 15/22 |
| 10,573,312 B1 * | 2/2020 | Thomson | ................ | G10L 15/26 |
| 2003/0050777 A1 * | 3/2003 | Walker, Jr. | .............. | G10L 15/32 704/235 |
| 2006/0074623 A1 * | 4/2006 | Tankhiwale | .......... | H04L 65/604 704/1 |
| 2009/0299743 A1 * | 12/2009 | Rogers | .............. | H04M 3/42221 704/235 |
| 2010/0049525 A1 * | 2/2010 | Paden | ..................... | G10L 15/22 704/270.1 |
| 2010/0268534 A1 * | 10/2010 | Kishan Thambiratnam | ................ | G10L 15/26 704/235 |

(Continued)

OTHER PUBLICATIONS

Search Report and Written Opinion received in International Application No. PCT/US2019/034952, dated Sep. 12, 2019.

*Primary Examiner* — Marcus T Riley
(74) *Attorney, Agent, or Firm* — Maschoff Brennan

(57) ABSTRACT

According to one or more aspects of the present disclosure, operations related to providing transcriptions may include obtaining a first transcription of first audio obtained by a first device during a communication session conducted between the first device and a second device. The operations may further include providing the first transcription for presentation of the first transcription by a display device during the communication session. In addition, the operations may include providing, in response to a transcription quality indication, a second transcription of second audio obtained by the second device during the communication session for presentation of the second transcription by the display device during the communication session.

20 Claims, 4 Drawing Sheets

(56) References Cited

U.S. PATENT DOCUMENTS

| | | | |
|---|---|---|---|
| 2011/0004930 A1* | 1/2011 | Ellis, III | G06F 9/5072 |
| | | | 726/11 |
| 2011/0123003 A1* | 5/2011 | Romriell | G06F 40/232 |
| | | | 379/52 |
| 2014/0314220 A1 | 10/2014 | Charugundla | |
| 2015/0341486 A1* | 11/2015 | Knighton | G10L 15/26 |
| | | | 455/414.1 |
| 2015/0348540 A1* | 12/2015 | Ljolje | G10L 15/01 |
| | | | 704/235 |
| 2017/0187876 A1* | 6/2017 | Hayes | H04M 3/56 |
| 2017/0201613 A1* | 7/2017 | Engelke | G10L 15/06 |
| 2017/0206808 A1* | 7/2017 | Engelke | H04W 4/12 |
| 2017/0206888 A1* | 7/2017 | Engelke | G10L 21/10 |
| 2018/0013866 A1* | 1/2018 | Herbert | H04L 65/1069 |
| 2018/0013886 A1 | 1/2018 | Rae et al. | |
| 2018/0034961 A1* | 2/2018 | Engelke | H04M 1/72591 |
| 2018/0227424 A1* | 8/2018 | Dorsey | H04M 1/72552 |
| 2018/0270350 A1* | 9/2018 | Engelke | G10L 15/265 |
| 2019/0355364 A1* | 11/2019 | Holm | G10L 15/265 |
| 2020/0075013 A1* | 3/2020 | Holm | G09B 21/009 |

\* cited by examiner

TRANSCRIPTION PRESENTATION

FIELD

The embodiments discussed in the present disclosure are related to presentation of transcriptions.

BACKGROUND

Transcriptions of audio communications between people may assist people who are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to providing transcriptions may include obtaining a first transcription of first audio obtained by a first device during a communication session conducted between the first device and a second device. The operations may further include providing the first transcription for presentation of the first transcription by a display device during the communication session. In addition, the operations may include providing, in response to a transcription quality indication, a second transcription of second audio obtained by the second device during the communication session for presentation of the second transcription by the display device during the communication session.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
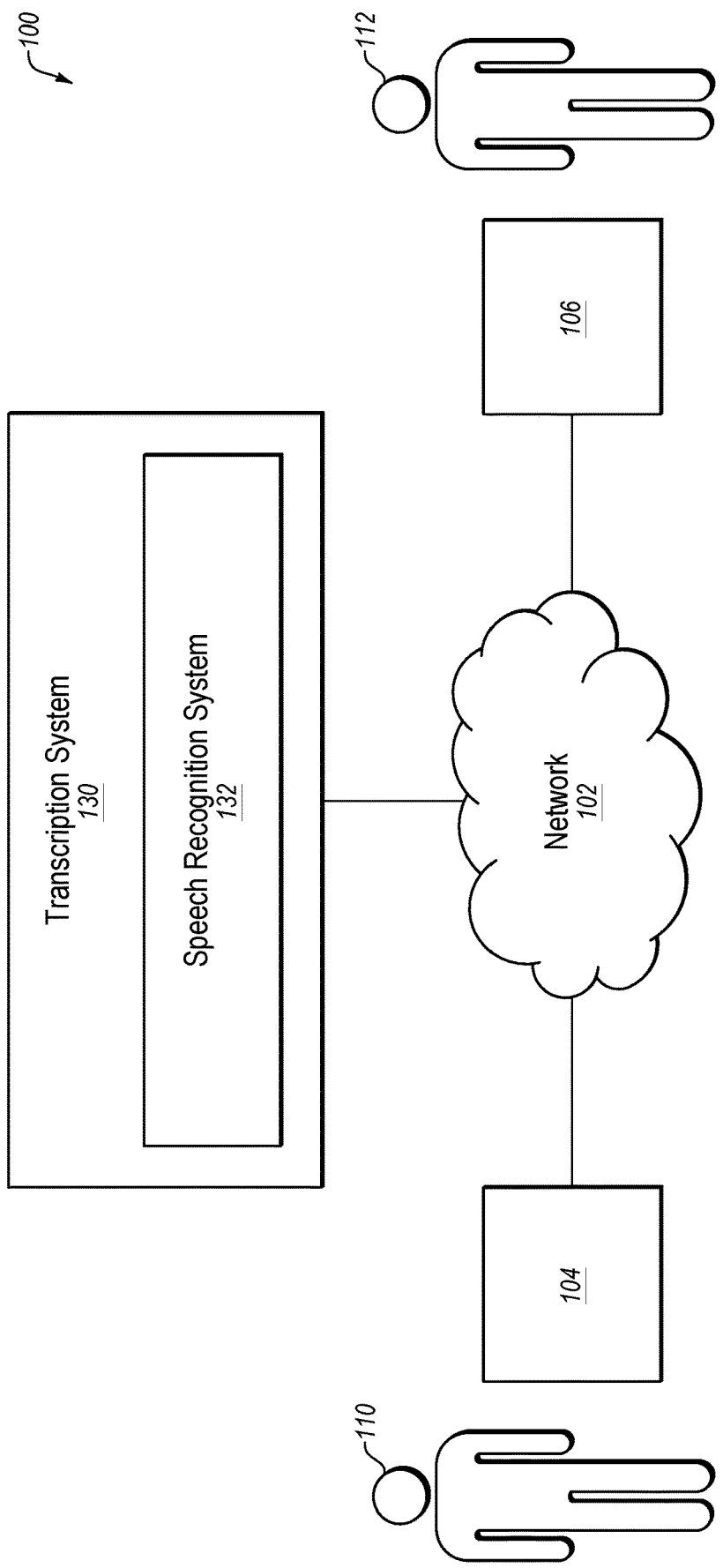
FIG. 1A illustrates an example environment for providing transcriptions for presentation.

Some embodiments in this disclosure relate to systems and methods that may be configured to transcribe audio of a communication session. For example, a communication session between a first device and a second device may correspond to an interaction between a first person and a second person. During the communication session, the first device may obtain first audio of the first person and the second device may obtain second audio of the second person. In some instances, a first transcription of the first audio may be provided for presentation by a display device associated with the second person (e.g., the second device or another device).

In these or other embodiments, rather than only providing the first transcription for presentation by the display device associated with the second person, a second transcription of the second audio may also be provided for presentation by the display device. In these or other embodiments, the first transcription and the second transcription may be presented together in real-time or substantially in real-time (referred to generally as "real-time presentation") as the first audio and the second audio are being obtained. Additionally or alternatively, the first transcription and the second transcription may have different identifiers indicating from whom the text of the first and second transcriptions originated. Additionally or alternatively, the real-time presentation of portions of the first transcription and the second transcription may be sequential with respect to the order in which the corresponding audio was obtained to reflect the order of what was said during the interaction.

In some embodiments, the generation and delivery of the first transcription and/or the second transcription may be substantially in real-time or real-time as the corresponding audio is received. In these and other embodiments, the first transcription and/or the second transcription may be provided for presentation in real-time or substantially in real-time as the first transcription and/or the second transcription are obtained. Generation and presentation of a transcription in real-time or substantially in real-time may indicate that when audio is presented during a communication session, a transcription that corresponds to the presented audio is also presented with a delay of less than 1, 2, 5, 10, or 15 seconds between the transcription and the audio.

The presentation of both the first transcription and the second transcription may allow for the second person to better understand what is being said during the interaction. For example, the second person may be deaf or hard of hearing and may use the first transcription to better understand what the first person is saying during the interaction. However, in some instances, the accuracy of the first transcription with respect to what is said by the first person may not be perfectly accurate such that the second person may not understand what the first person said as well as if the first transcription was more accurate. The providing of the second transcription of what the second person says during the interaction may help provide more context to the words of the first transcription such that the second person may better understand what was actually said by the first person when the first transcription does not accurately convey everything said by the first person. As such, in some embodiments as detailed below, the second transcription may be provided for presentation to the second person in response to a transcription quality indication that indicates that the first transcription is below a particular level.

The systems and methods used to provide transcriptions described in this disclosure may result in the improvement of transcription systems by helping compensate for potential inaccuracies in transcriptions through the presentation of more than one side of an interaction. For example, as indicated above, the systems and methods described in this disclosure may provide persons with improved user experiences by helping persons (e.g., hard of hearing or deaf persons) better understand what is said during interactions when transcriptions may not be completely accurate.

Turning to the figures, FIG. 1A illustrates an example environment 100 for providing transcriptions for presentation. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

The first device 104 or the second device 106 may be any electronic or digital computing device. For example, the first device 104 or the second device 106 may include a desktop computer, a laptop computer, a smartphone, a mobile phone, a tablet computer, a telephone, a phone console, a caption device, a captioning telephone, or any other computing device that may be used for communication between users of the first device 104 and the second device 106.

In these or other embodiments, the first device 104 or the second device 106 may be configured as a hub type of device that may be associated with one of the corresponding users and that may relay data related to a communication session (e.g., audio data, video data, transcription data, etc.) to other devices associated with the same user. For example, the first device 104 may be associated with a first person 110 and the second device 106 may be associated with a second person 112. The first device 104 may conduct a particular communication session with the second device 106 with respect to an interaction of the first person 110 with the second person 112. Additionally, in instances in which the second device 106 is configured as a hub type device, the second device 106 may relay data associated with the particular communication session between the first device 104 and one or more other devices that may be associated with the second person 112 and that may be used by the second person 112 to conduct the interaction with the first person 110. Additionally or alternatively, the first device 104 may operate in a similar manner when configured as a hub type device. One or more examples of a device operating as a hub type device can be found in U.S. Application Publication No. 2018/0102129, which is incorporated herein by reference in its entirety.

In some embodiments, the first device 104 or the second device 106 may be a stand-alone hub type device. Additionally or alternatively, the first device 104 or the second device 106 may be another type of device (e.g., a desktop computer, a laptop computer, a smartphone, a mobile phone, a tablet computer, a telephone, a phone console, a caption device, a captioning telephone, etc.) that is also configured to operate as a hub type device.

In some embodiments, the first device 104 or the second device 106 may include memory and at least one processor, which are configured to perform operations as described in this disclosure, among other operations. In some embodiments, the first device 104 or the second device 106 may include computer-readable instructions that are configured to be executed by the first device 104 or the second device 106 to perform operations described in this disclosure.

In some embodiments, each of the first device 104 and the second device 106 may be configured to establish communication sessions with other devices. For example, each of the first device 104 and the second device 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS.

In some embodiments, each of the first device 104 and the second device 106 may be configured to obtain audio during a communication session. The audio may be part of a video communication or an audio communication, such as a telephone call. As used in this disclosure, the term "audio" may be used generically to refer to sounds that may include spoken words. Furthermore, the term "audio" may be used generically to include audio in any format, such as a digital data format, an analog data format, or a propagating wave format. Furthermore, in the digital data format, the audio may be compressed using any suitable type of compression scheme. Also, as used in this disclosure, the term "video" may be used generically to refer to a compilation of images that may be reproduced in a sequence to produce video. Furthermore, the term "video" may be used generically to include video in any format, such as a digital data format or an analog data format. Furthermore, in the digital data format, the video may be compressed using any suitable type of compression scheme.

As an example of obtaining audio, the first device 104 may be configured to obtain first audio of the first person 110. For example, the first device 104 may obtain the first audio from a microphone of the first device 104 or from another device that is communicatively coupled to the first device 104.

The second device 106 may also be configured to obtain second audio of the second person 112. In some embodiments, the second device 106 may obtain the second audio from a microphone of the second device 106 or from another device communicatively coupled to the second device 106. During the communication session, the first device 104 may communicate the first audio for reception by the second device 106. Alternatively or additionally, the second device 106 may communicate the second audio for reception by the first device 104. One or both of the first device 104 and the second device 106 may be configured to provide the first audio, the second audio, or both the first audio and the second audio to the transcription system 130.

In general, the transcription system 130 may be configured to obtain transcriptions of audio using a speech recognition system 132. In some embodiments, the transcription system 130 or the speech recognition system 132 may include any configuration of hardware and/or software, such as one or more processors, servers, or database servers that are configured to perform a task. For example, the transcription system 130 or the speech recognition system 132 may include one or multiple computing systems, such as multiple servers that each include memory and at least one processor. In these or other embodiments, the transcription system 130 and the speech recognition system 132 may be integrated together as a same system. Additionally or alternatively, the transcription system 130 and the speech recognition system 132 may be separate systems that are communicatively coupled (e.g., via the network 102). In these or other embodiments, the transcription system 130 and the speech recognition system 132 may be controlled or maintained by a same entity. Additionally or alternatively, the transcription system 130 and the speech recognition system 132 may be controlled or maintained by different entities such that the speech recognition system 132 may be a third-party system with respect to the transcription system 130.

The speech recognition system 132 may be configured to generate transcriptions of audio. In these and other embodiments, the speech recognition system 132 may be configured to recognize speech in the audio. Based on the recognized speech, the speech recognition system 132 may output a transcription of the speech. The transcription may be a written version of the speech in the audio. In the present disclosure, use of the term "transcription" may be used generically to include a transcription of text in any format, such as presented text or data that represents the text.

In some embodiments, the speech recognition system 132 may be a machine based automatic speech recognition (ASR) system that may include an ASR engine trained to recognize speech. In some embodiments, the ASR engine may be trained for general speech and not specifically trained using speech patterns of the participants in the interaction related to the communication session, e.g., the first person 110 or the second person 112. Alternatively or additionally, the ASR engine may be specifically trained using speech patterns of one of the participants of the interaction.

Alternatively or additionally, the speech recognition system 132 may be a re-voicing transcription system. Re-voicing transcription systems may receive and broadcast audio to a captioning agent (e.g., a human captioning agent). The captioning agent may listen to the broadcast and speak the words from the broadcast. The words spoken by the captioning agent are captured to generate re-voiced audio. The re-voiced audio may be used by a speech recognition program to generate the transcription of the audio. In some embodiments, the speech recognition program may be trained to the voice of the captioning agent.

In these or other embodiments, the speech recognition system 132 may determine one or more confidence metrics for the transcriptions. The confidence metrics may indicate a degree of confidence in the accuracy of the corresponding transcription, as determined by the speech recognition system 132. For example, in instances in which the speech recognition system 132 includes an ASR engine, the speech recognition system 132 may generate one or more ASR confidence value scores for a corresponding transcription.

An example of the transcription system 130 obtaining transcriptions is now provided in the context of the environment 100 of FIG. 1A with respect to the communication session conducted between the first device 104 and the second device 106. For example, in some embodiments, as indicated above, the transcription system 130 may receive the first audio that may be obtained by the first device 104 during the communication session. In some embodiments, the transcription system 130 may receive the first audio from the first device 104. Additionally or alternatively, the transcription system 130 may receive the first audio from the second device 106.

The transcription system 130 may be configured to obtain a first transcription of the first audio. For example, the transcription system 130 may communicate the first audio to the speech recognition system 132. The speech recognition system 132 may generate the first transcription of the first audio. In these or other embodiments, the speech recognition system 132 may communicate the first transcription to the transcription system 130. Additionally or alternatively, the transcription system 130 may be configured to obtain the first transcription in real-time or substantially in real-time as the first audio is received.

In these or other embodiments, the transcription system 130 may provide the first transcription for presentation by a display device associated with the second person 112. For example, in some embodiments, the second device 106 may include a display device configured to present the first transcription. In these or other embodiments, the transcription system 130 may communicate the first transcription to the second device 106 and the second device 106 may present the first transcription via the display device. Additionally or alternatively, the transcription system 130 may communicate the first transcription to another device associated with the second person 112 that includes a display device that may present the first transcription. Additionally or alternatively, the transcription system 130 may communicate the first transcription to the second device 106 and the second device 106 (e.g., operating as a hub type device) may communicate the first transcription to another device associated with the second person 112. In these or other embodiments, the other device may include a display device that may present the first transcription.

In some embodiments, the transcription system 130 may provide the first transcription for presentation during the communication session. In these or other embodiments, the transcription system 130 may provide the first transcription in real-time or substantially in real-time as the first transcription is obtained such that the first transcription may be presented in real-time or substantially in real-time with the presentation of the first audio.

In some embodiments, the transcription system 130 may be configured to perform operations similar to those described above with respect to the second audio to obtain a second transcription of the second audio. In these or other embodiments, the transcription system 130 may receive the second audio from the second device 106 and/or the first device 104.

In some embodiments, the transcription system 130 may be configured to provide the second transcription for presentation by a display device associated with the second person 112 such as described above with respect to providing the first transcription for presentation by a display device associated with the second person 112. In these or other embodiments, the second transcription may be provided for presentation by the same display device as the first transcription.

In some embodiments, the transcription system 130 may provide the second transcription for presentation during the communication session. In these or other embodiments, the transcription system 130 may provide the second transcription in real-time or substantially in real-time as the second transcription is obtained such that the second transcription may be presented in real-time or substantially in real-time with the obtaining of the second audio.

As indicated above, the first transcription and the second transcription may be generated in an ongoing basis during the communication session as the first audio and the second audio are generated and obtained during the communication session. In some embodiments, the transcription system 130 may be configured to provide the first transcription and the second transcription together in which first portions of the first transcription and second portions of the second transcription may be provided and presented in the order in which the corresponding audio was obtained. As such, in some embodiments, the first transcription and the second transcription may be provided in a manner that reflects the interaction between the first person 110 and the second person 112.

Figure 1C:
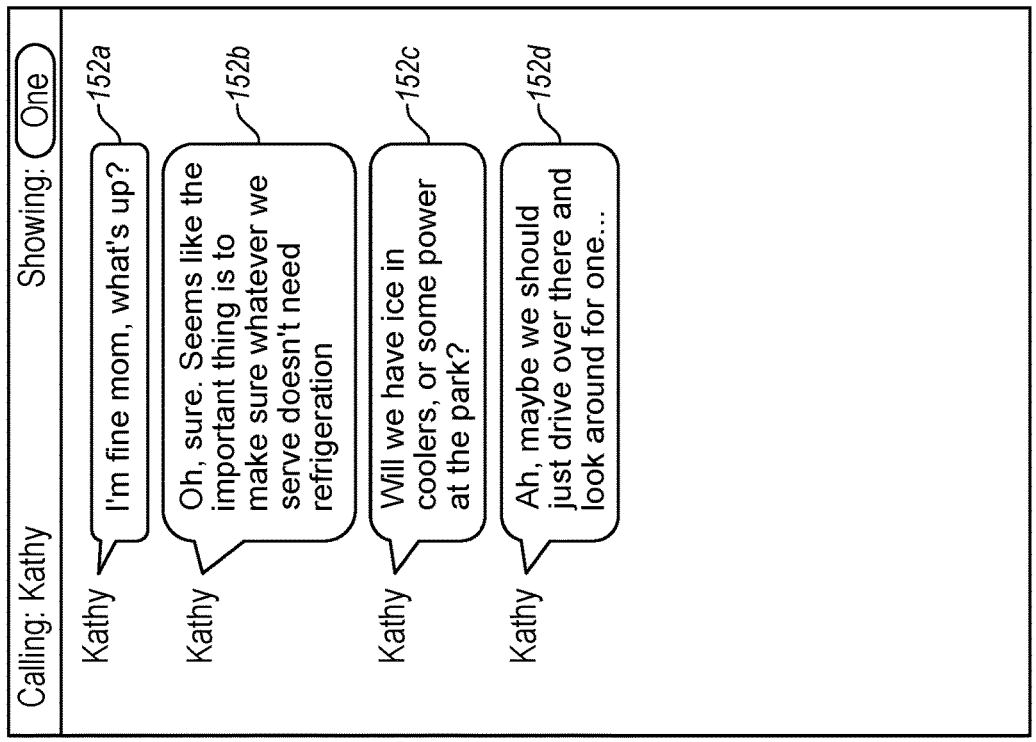
FIG. 1C illustrates another example transcription presentation.
Figure 1B:
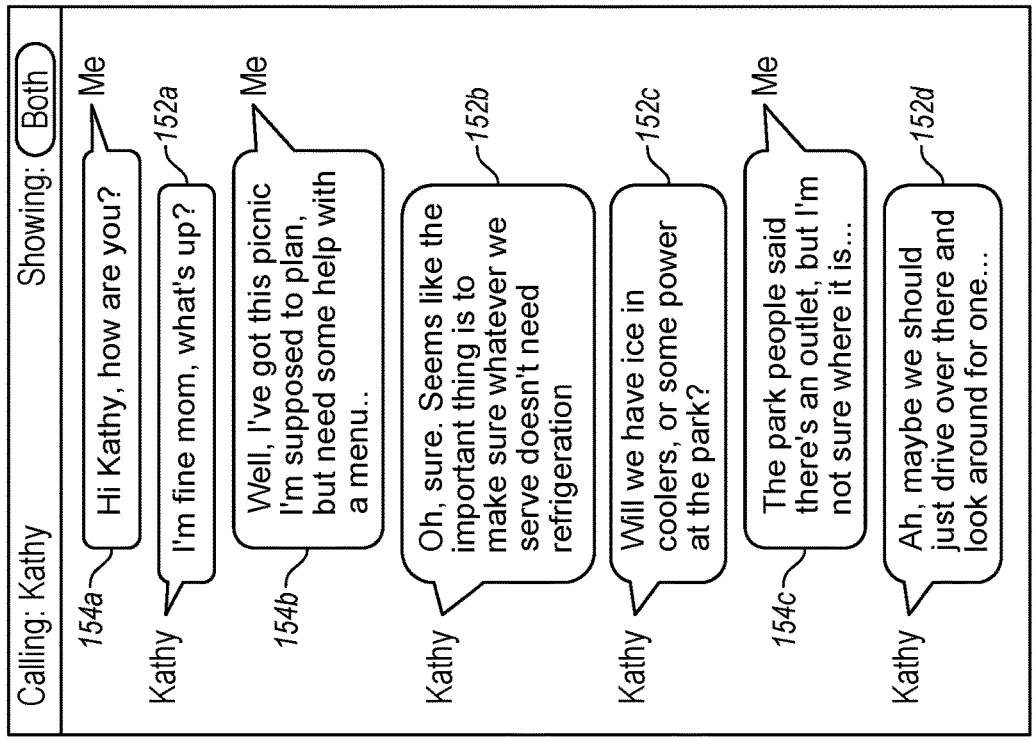
FIG. 1B illustrates an example transcription presentation.

For example, FIG. 1B illustrates an example presentation 150 of example first portions 152*a*, 152*b*, 152*c*, and 152*d* (referred to generally as "first portions 152") of the first transcription and example second portions 154*a*, 154*b*, and 154*c* (referred to generally as "second portions 154") of the second transcription. In the example of FIG. 1B, the presentation 150 may be presented by a display device associated with the second person 112. Additionally, as indicated above, the first portions 152 may correspond to what was spoken by the first person 110 and the second portions 154 may correspond to what was spoken by the second person 112 during the interaction between the first person 110 and the second person 112 associated with the communication session.

In FIG. 1B, the first portions 152 and the second portions 154 may be presented in the same sequential order as the corresponding audio was spoken during the interaction. By way of example, the interaction that corresponds to FIG. 1B may proceed as follows: the second person 112 may speak the words that correspond to the second portion 154*a*; the first person 110 may then speak the words that correspond to the first portion 152*a*; the second person 112 may then speak the words that correspond to the second portion 154*b*; the first person 110 may then speak the words that correspond to the first portions 152*b* and 152*c*; the second person 112 may then speak the words that correspond to the second portion 154*c*; and the first person 110 may then speak the words that correspond to the first portion 152*d*. Based on the above sequence during the interaction, the first portions 152 and the second portions 154 may accordingly be presented in the following order as illustrated in FIG. 1B: (1) second portion 154*a*; (2) first portion 152*a*; (3) second portion 154*b*; (4) first portion 152*b*; (5) first portion 152*c*; (6) second portion 154*c*; and (7) first portion 152*d*.

In these or other embodiments, the first transcription and the second transcription may be presented in a variety of different manners. For example, with respect to FIG. 1B, the first portions 152 and the second portions 154 are illustrated as being presented in "bubbles" that include the corresponding text. In these or other embodiments, the first portions 152 and the second portions 154 may be presented in different formats from each other (e.g., different colors, fonts, size, font size, font styles, "bubble" shape, "bubble" size, "bubble" color, "bubble" arrow participant indicator, etc.) to help distinguish what was said by whom. Additionally or alternatively, the formats of the first portions 152 and the second portions 154 may be substantially the same. In some embodiments, the format of one or more characteristics of the first portions 152 and the second portions 154 as presented may be selected by the second person 112. Additionally or alternatively, the format of the presentation of the first portions 152 and the second portions 154 may be directed by the transcription system 130, the second device 106, and/or the display device that is presenting the presentation 150.

In these or other embodiments, the presentation of the first transcription and the second transcription may include indicators as to who said what. For example, with respect to FIG. 1B, the first person 110 may be named "Kathy" and, as indicated above, the presentation 150 may be presented by the display device associated with the second person 112. In the presentation 150, the name "Kathy" may thus be presented next to the first portions 152 to indicate that the words of the first portions 152 were spoken by "Kathy." Additionally, the word "Me" may be presented next to the second portions 154 to indicate to the second person 112 that she spoke the words of the second portions 154. In some embodiments, the second person 112 may be able to select whether or not the contact information (e.g., "Kathy" illustrated in FIG. 1B) may be presented next to the first portions 152.

In some embodiments, the presentation of the second transcription by the display device associated with the second person 112 may be in response to a transcription quality indication. In some embodiments, the transcription quality indication may be with respect to the first transcription and may indicate an accuracy of the first transcription. For example, the transcription quality indication may include a user rating of the first transcription by the second person 112 or a confidence metric (e.g., a confidence score) of the first transcription.

In some embodiments, during a first part of the communication session the first transcription may be presented by the display device associated with the second person but not the second transcription. For instance, FIG. 1C illustrates a presentation 151 in which the first portions 152 of FIG. 1B are illustrated and the second portions 154 are omitted.

During the communication session, the transcription quality indication with respect to the first transcription may be obtained. In these or other embodiments, the transcription quality indication may indicate that the accuracy of the first transcription is below a particular level. In response to the transcription quality indication indicating that the accuracy of the first transcription may be below the particular level, as discussed in detail below, it may be determined to present the second transcription with the first transcription by the display device associated with the second person 112 (e.g., such as indicated by the presentation 150 of FIG. 1B) during a second part of the communication session.

For example, as indicated above, the transcription quality indication may be a confidence metric of the first transcription and the confidence metric may have a value that does not satisfy a confidence threshold. In response to the confidence metric not satisfying the confidence threshold, it may be determined to have the second transcription presented with the first transcription. The confidence threshold may vary depending on particular implementations, a system type of the speech recognition system 132, or any other consideration. For example, the confidence threshold may vary depending on the technique used to generate the confidence metric, a correlation between accuracy of the transcription and values of the confidence metric, user feedback, system constraints, consumer retention, or system use, among others.

As another example, during the communication session, the second person 112 may be given an opportunity to provide a user rating with respect to the first transcription. In response to the user rating not satisfying a rating threshold, the second transcription may be presented with the first transcription by the display device associated with the second person 112. The rating threshold may vary depending on particular implementations. For example, the rating threshold may vary depending on the rating system used, user feedback, system constraints, consumer retention, or system use, among others.

The decision as to whether to present the second transcription with the first transcription may be made by the display device, the second device 106 (of which the display device may be part in some embodiments), or the transcription system 130. Additionally, prior to the determination to present the second transcription, one or more operations related to presenting the second transcription may or may not have been performed with respect to the second transcription. For example, in some embodiments, the second audio may not be sent to the transcription system 130 for the obtaining of the second transcription until after it is determined to present the second transcription. Additionally or alternatively, the second audio may be sent to the transcription system 130 prior to the determination to present the second transcription, but the transcription system 130 may not obtain the second transcription until after it is determined to present the second transcription. Additionally or alternatively, the transcription system 130 may obtain the second transcription prior to the determination to present the second transcription, but the transcription system 130 may not provide the second transcription for presentation until after it is determined to present the second transcription. Additionally or alternatively, the transcription system 130 may provide the second transcription prior to the determination to present the second transcription, but the display device may not present the second transcription until after it is determined to present the second transcription. For example, the transcription system 130 may provide the second transcription to the second device 106, but the second device 106 may not provide the second transcription to the display device for presentation by the display device. As another example, the second device 106 or the transcription system 130 may provide the second transcription to the display device, but the display device may not present the second transcription.

In some embodiments, the transcription quality indication may be with respect to one or more previous transcriptions of one or more previous communication sessions. In these or other embodiments, the transcription quality indication may indicate an accuracy of the one or more previous transcriptions. In some embodiments, the previous transcriptions may have been generated by the speech recognition system 132. Additionally or alternatively, the previous transcriptions may be associated with one or more of: a previous interaction of the second person 112, a previous interaction of the first person 110, and a previous interaction of another person. In these or other embodiments, the second transcription may be presented with the first transcription during all of the communication session in instances in which the determination as to whether to present the second transcription is in response to a transcription quality indication that corresponds to one or more previous transcriptions.

In some embodiments, the transcription quality indication may include one or more confidence metrics of one or more of the previous transcriptions. For example, the confidence metric of the most recent previous transcription may have a value that does not satisfy the confidence threshold. In response to the confidence metric of the most recent previous transaction not satisfying the confidence threshold, it may be determined to have the second transcription presented with the first transcription by the display device associated with the second person 112.

As another example, the confidence metric of the most recent previous transcription that may correspond to the second person 112 may have a value that does not satisfy the confidence threshold. In response to the confidence metric of the most recent previous transaction that corresponds to the second person 112 not satisfying the confidence threshold, it may be determined to have the second transcription presented with the first transcription by the display device associated with the second person 112.

As another example, an average value of the confidence metrics of multiple previous transcriptions may not satisfy the confidence threshold. In these or other embodiments, the average may be weighted. For example, confidence metrics of more recent previous transcriptions may be weighted more than the confidence metrics of less recent previous transcriptions. In response to the average value of the confidence metrics of the multiple previous transactions not satisfying the confidence threshold, it may be determined to have the second transcription presented with the first transcription by the display device associated with the second person 112. In some embodiments, the number of previous transcriptions used to determine the average may vary. For example, the number may be based on a recency of the previous transcriptions (e.g., analyze previous transcriptions that go back a certain period of time), user feedback, system constraints, consumer retention, or system use, among others.

As another example, it may be determined how many of a certain number of previous transcriptions have a confidence metric that does not satisfy the confidence threshold. In response to the number of previous transcriptions that do not satisfy the confidence threshold being higher than a threshold number, it may be determined to have the second transcription presented with the first transcription by the display device associated with the second person 112. The threshold number may vary depending on particular considerations that may be applicable to particular instances. For example, the threshold number may be determined based on user feedback, system constraints, consumer retention, or system use, among others. Additionally, the certain number of previous transcriptions to analyze may vary. For example, the certain number may be based on a recency of the previous transcriptions (e.g., analyze previous transcriptions that go back a certain period of time), user feedback, system constraints, consumer retention, or system use, among others.

In some embodiments, the transcription quality indication may include a user rating of one or more of the previous transcriptions. In these or other embodiments, the user ratings may include one or more of: one or more user ratings of one or more of the previous transcriptions by the second person 112, one or more user ratings of one or more of the previous transcriptions by the first person 110, one or more user ratings of one or more of the previous transcriptions by another person.

For example, the user rating of the most recent previous transcription may not satisfy the rating threshold. In response to the user rating of the most recent previous transaction not satisfying the rating threshold, it may be determined to have the second transcription presented with the first transcription by the display device associated with the second person 112.

As another example, the user rating of the most recent previous transcription that may correspond to the second person 112 may not satisfy the rating threshold. In response to the user rating of the most recent previous transaction that corresponds to the second person 112 not satisfying the rating threshold, it may be determined to have the second transcription presented with the first transcription by the display device associated with the second person 112.

As another example, an average rating of multiple previous transcriptions may not satisfy the rating threshold. In these or other embodiments, the average may be weighted. For example, user ratings of more recent previous transcriptions may be weighted more than the user ratings of less recent previous transcriptions. In response to the average rating of the multiple previous transactions not satisfying the rating threshold, it may be determined to have the second transcription presented with the first transcription by the display device associated with the second person 112. In some embodiments, the number of previous transcriptions used to determine the average user rating may vary. For example, the number may be based on a recency of the previous transcriptions (e.g., analyze previous transcriptions that go back a certain period of time), user feedback, system constraints, consumer retention, or system use, among others.

As another example, it may be determined how many of a certain number of previous transcriptions have a user rating that does not satisfy the rating threshold. In response to the number of previous transcriptions that do not satisfy the rating threshold being higher than a threshold number, it may be determined to have the second transcription presented with the first transcription by the display device associated with the second person 112. The threshold number may vary depending on particular considerations that may be applicable to particular instances. For example, the threshold number may be determined based on user feedback, system constraints, consumer retention, or system use, among others. Additionally, the certain number of previous transcriptions to analyze may vary. For example, the certain number may be based on a recency of the previous transcriptions (e.g., analyze previous transcriptions that go back a certain period of time), user feedback, system constraints, consumer retention, or system use, among others.

As another example, during or before the communication session, the second person 112 may provide an indication requesting the second transcription. In response to the request for the second transcription, the second transcription may be presented with the first transcription by the display device associated with the second person 112.

In some embodiments, presentation of the second transcription may be stopped in response to a change in the transcription quality indication being such that the transcription quality indication indicates that the transcription accuracy is above the particular level. For example, the confidence metric of the first transcription may change such that the confidence metric has a value that satisfies the confidence threshold. In response to the confidence metric satisfying the confidence threshold, it may be determined to stop presentation of the second transcription with the first transcription. As another example, the user rating of the first transcription may change such that the user rating satisfies the rating threshold. In response to the user rating satisfying the rating threshold, it may be determined to stop presentation of the second transcription with the first transcription. As another example, during the communication session, the second person 112 may provide an indication requesting that presentation of the second transcription be stopped. In response to the request to stop presentation of the second transcription, the presentation of the second transcription may be stopped.

The decision as to whether to stop presentation of the second transcription with the first transcription may be made by the display device, the second device 106 (of which the display device may be part in some embodiments) or the transcription system 130. Additionally, after the determination to stop presenting the second transcription, one or more operations related to presenting the second transcription may or may not be performed with respect to the second transcription. For example, in some embodiments, the second audio may not be sent to the transcription system 130 for the obtaining of the second transcription. Additionally or alternatively, the second audio may be sent to the transcription system 130 after the determination to stop presenting the second transcription, but the transcription system 130 may not obtain the second transcription (e.g., the transcription system 130 may not provide the second audio to the speech recognition system 132 for generation of the second transcription). Additionally or alternatively, the transcription system 130 may obtain the second transcription after the determination to stop presenting the second transcription, but the transcription system 130 may not provide the second transcription for presentation. Additionally or alternatively, the transcription system 130 may provide the second transcription after the determination to stop presenting the second transcription, but the display device may not present the second transcription. For example, the transcription system 130 may provide the second transcription to the second device 106, but the second device 106 may not provide the second transcription to the display device. As another example, the second device 106 or the transcription system 130 may provide the second transcription to the display device, but the display device may not present the second transcription.

Modifications, additions, or omissions may be made to the environment 100 without departing from the scope of the present disclosure. For example, in some embodiments, the transcription system 130 may include additional functionality. For example, the transcription system 130 may edit the transcriptions or make other alterations to the transcriptions after presentation of the transcriptions one or both of the first device 104 and the second device 106. Additionally or alternatively, the transcription system 130 and/or the second device 106 may be configured to save the transcriptions. In these or other embodiments, the transcriptions may be saved in response to an input obtained from the second person 112. In these or other embodiments, the saved transcriptions may be sent (e.g., via email, text message, etc.) to one or more addresses (e.g., email addresses, cell numbers, etc.). In these or other embodiments, the saved transcriptions may be sent as directed by the second person 112.

Additionally or alternatively, in some embodiments, the second transcriptions may be provided for presentation during the communication session by a display device associated with the first person 110. In these or other embodiments, the first transcriptions may be provided for presentation during the communication session by the display device associated with the first person in response to a transcription quality indication such as described above. For example, the first transcriptions may be provided for presentation during the communication session by the display device associated with the first person in response to a transcription quality indication associated with the second transcription, one or more previous transcriptions, or a user request by the first person 110. In these or other embodiments, the presentation of the first transcription may be stopped in a manner analogous to that described above with respect to stopping presentation of the second transcription.

Additionally or alternatively, the environment 100 may include fewer elements than those described. For example, in some embodiments, the transcription system 130 may be omitted and the second device 106 and/or the first device 104 may perform the operations described with respect to the transcription system 130.

Alternatively or additionally, in some embodiments, the environment 100 may include additional devices. In these and other embodiments, the additional devices may be configured to obtain user ratings and/or present communications as described in this disclosure. For example, the second device 106 may receive a request for a communication from the first device 104. A third device may alert the second person 112 of the request and capture audio of the second person 112. Alternatively or additionally, a fourth device may present transcriptions to the second person 112. In these and other embodiments, each of the second device 106, the third device, and the fourth device may be associated with second person 112, communicatively coupled, and coordinated to perform operations as described with respect to the second device 106 in this disclosure.

Figure 2:
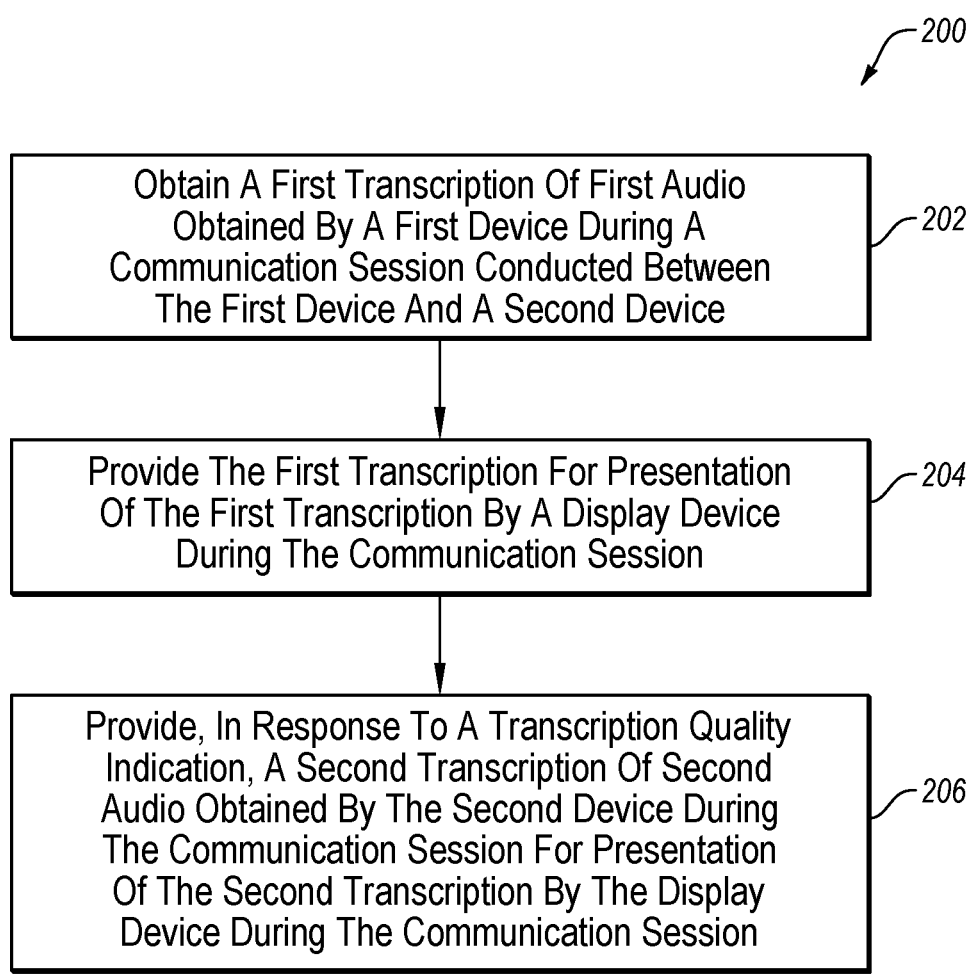
FIG. 2 illustrates a flowchart of an example method of providing transcriptions for presentation.

FIG. 2 illustrates a flowchart of an example method 200 of providing transcriptions for presentation. The method 200 may be arranged in accordance with at least one embodiment described in the present disclosure. One or more operations of the method 200 may be performed, in some embodiments, by a device or system, such as the transcription system 130, the first device 104, and/or the second device 106 of FIG. 1A or the system 300 of FIG. 3, or another device or combination of devices. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 202, where a first transcription of first audio obtained by a first device during a communication session conducted between the first device and a second device may be obtained. In some embodiments, the first transcription may be obtained from a speech recognition system, such as the speech recognition system 132 of FIG. 1A. For example, the first audio may be sent to the speech recognition system, the speech recognition system may generate the first transcription based on the first audio, and the first transcription may be received from the speech recognition system.

At block 204, the first transcription may be provided for presentation by a display device during the communication session. In some embodiments, the display device may be associated with a person participating in an interaction associated with the communication session.

At block 206, a second transcription of second audio obtained by the second device during the communication session may be provided for presentation by the display device during the communication session. In some embodiments, the second transcription may be provided in response to a transcription quality indication. In some embodiments, the transcription quality indication may be with respect to one or more previous transcriptions of one or more previous communication sessions, such as described above with respect to FIG. 1A. For example, as described above, the transcription quality indication may be with respect to the first transcription. In these or other embodiments, the transcription quality indication may be based on one or more of: a confidence metric of the first transcription; a user request for the second transcription by a person associated with the second device; a user rating of the first transcription; a confidence metric of one or more of the previous transcriptions; and a user rating of one or more of the previous transcriptions.

In some embodiments, the first transcription and not the second transcription may be provided for presentation during a first portion of the communication session. Additionally or alternatively, both the first transcription and the second transcription may be provided for presentation during a second portion of the communication session.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 200 may further include operations related to stopping providing the second transcription for presentation in response to a change in the transcription quality indication, such as described above. As another example, in some embodiments, the second device may include the display device. Additionally or alternatively, the second device may be separate from the display device.

Figure 3:
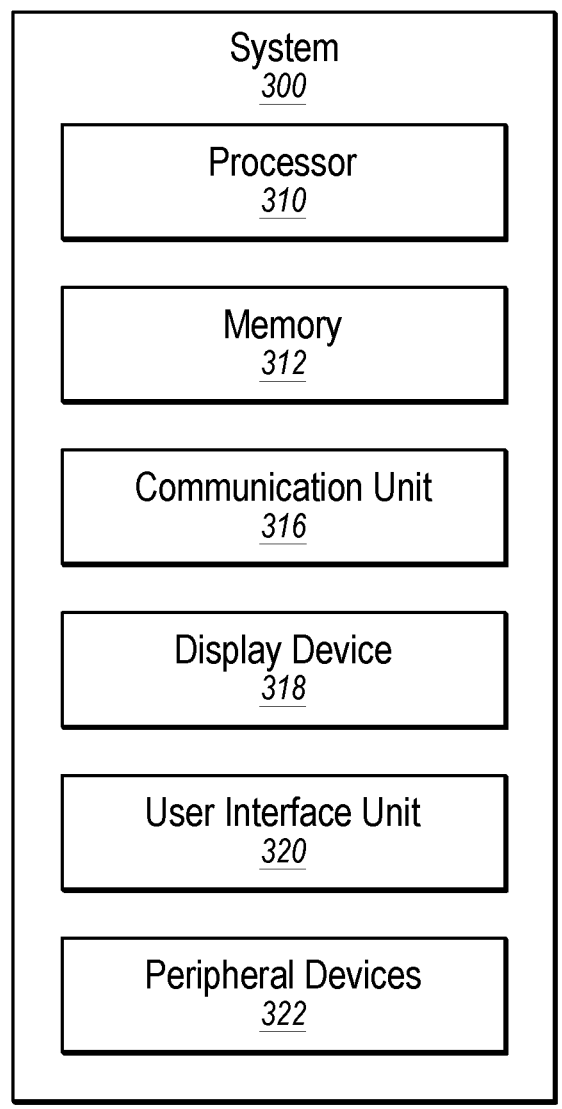
FIG. 3 illustrates an example system that may be used during the providing of transcriptions for presentation.

FIG. 3 illustrates an example system 300 that may be used during the providing transcriptions for presentation. The system 300 may be arranged in accordance with at least one embodiment described in the present disclosure. The system 300 may include a processor 310, memory 312, a communication unit 316, a display device 318, a user interface unit 320, and a peripheral device 322, which all may be communicatively coupled. In some embodiments, the system 300 may be part of any of the systems or devices described in this disclosure.

For example, the system 300 may be part of the first device 104 of FIG. 1A and may be configured to perform one or more of the tasks described above with respect to the first device 104. As another example, the system 300 may be part of the second device 106 of FIG. 1A and may be configured to perform one or more of the tasks described above with respect to the second device 106. As another example, the system 300 may be part of the transcription system 130 of FIG. 1A and may be configured to perform one or more of the tasks described above with respect to the transcription system 130. Additionally or alternatively, the system 300 may be part of another device that may be configured to perform operations related to the presentation of transcriptions.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to presentation of transcriptions such that the system 300 may perform or direct the performance of the operations associated therewith as directed by the instructions. In these and other embodiments, the instructions may be used to perform one or more operations of the method 200 of FIG. 2.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 316 may permit data to be exchanged with a network and/or any other devices or systems described in the present disclosure. For example, when the system 300 is included in the first device 104 of FIG. 1A, the communication unit 316 may allow the first device 104 to communicate with the transcription system 130.

The display device 318 may be configured as one or more displays that present images, words, etc., like an LCD, LED, projector, or other type of display. The display device 318 may be configured to present video, text captions, user interfaces, and other data as directed by the processor 310. For example, when the system 300 is included in the second device 106 of FIG. 1A, the display device 318 may be configured to present transcriptions and/or a selectable element.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display device 318 may be combined.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." For example, the phrase "A or B" should be understood to include the possibilities of "A" or "B" or "A and B" even if the term "and/or" is used elsewhere.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a first transcription of first audio obtained by a first device during a communication session conducted between the first device and a second device;
   providing, during the communication session, the first transcription for presentation of the first transcription by a display device associated with a person who is associated with the second device; and
   providing, in response to a transcription quality indication related to an accuracy of the first transcription, a second transcription of second audio obtained by the second device during the communication session for presentation of the second transcription by the display device during the communication session.

2. The method of claim 1, wherein the transcription quality indication is based on one or more of: a confidence metric of the first transcription; a user request for the second transcription by the person; and a user rating of the first transcription by the person.

3. The method of claim 1, wherein the second device includes the display device.

4. The method of claim 1, wherein the first transcription and not the second transcription is provided for presentation during a first part of the communication session and both the first transcription and the second transcription are provided for presentation during a second part of the communication session.

5. The method of claim 1, further comprising stopping providing the second transcription for presentation in response to a change in the transcription quality indication.

6. At least one non-transitory computer-readable media configured to store one or more instructions that, in response to being executed by at least one computing system, cause performance of the method of claim 1.

7. A method comprising:
   obtaining a first transcription of first audio obtained by a first device during a communication session conducted between the first device and a second device;
   providing the first transcription for presentation of the first transcription by a display device during the communication session; and
   providing, in response to a transcription quality indication, a second transcription of second audio obtained by the second device during the communication session for presentation of the second transcription by the display device during the communication session.

8. The method of claim 7, wherein the transcription quality indication is with respect to a previous transcription of a previous communication session.

9. The method of claim 7, wherein the transcription quality indication is with respect to the first transcription.

10. The method of claim 7, wherein the transcription quality indication is based on one or more of: a confidence metric of the first transcription; a user request for the second transcription by a person associated with the second device; a user rating of the first transcription; a confidence metric of a previous transcription of a previous communication session; and a user rating of the previous transcription.

11. The method of claim 7, wherein the second device includes the display device.

12. The method of claim 7, wherein the first transcription and not the second transcription is provided for presentation during a first part of the communication session and both the first transcription and the second transcription are provided for presentation during a second part of the communication session.

13. The method of claim 7, further comprising stopping providing the second transcription for presentation in response to a change in the transcription quality indication.

14. At least one non-transitory computer-readable media configured to store one or more instructions that, in response to being executed by at least one computing system, cause performance of the method of claim 7.

15. A system comprising:
   one or more processors; and
   one or more computer-readable media configured to store instructions that in response to being executed by the one or more processors cause the system to perform operations, the operations comprising:

obtaining a first transcription of first audio obtained by a first device during a communication session conducted between the first device and a second device;

providing, during the communication session, the first transcription for presentation of the first transcription by a display device associated with a person who is associated with the second device; and providing, in response to a transcription quality indication related to an accuracy of the first transcription, a second transcription of second audio obtained by the second device during the communication session for presentation of the second transcription by the display device during the communication session.

16. The system of claim 15, wherein the transcription quality indication is with respect to one or more of: a previous transcription of a previous communication session and the first transcription.

17. The system of claim 15, wherein the transcription quality indication is based on one or more of: a confidence metric of the first transcription; a user request for the second transcription by a person associated with the second device; a user rating of the first transcription; a confidence metric of a previous transcription of a previous communication session; and a user rating of the previous transcription.

18. The system of claim 15, wherein the second device includes the display device.

19. The system of claim 15, wherein the first transcription and not the second transcription is provided for presentation during a first part of the communication session and both the first transcription and the second transcription are provided for presentation during a second part of the communication session.

20. The system of claim 15, wherein the operations further comprise stopping providing the second transcription for presentation in response to a change in the transcription quality indication.

* * * * *